(12) United States Patent
Sundstrom (10) Patent No.: US 7,016,176 B1
(45) Date of Patent: Mar. 21, 2006

(54) LOW ESL AND ESR CHIP CAPACITOR

(75) Inventor: Lance L. Sundstrom, Pinellas Park, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/100,872

(22) Filed: Apr. 7, 2005

(51) Int. Cl.
*H01G 4/228* (2006.01)

(52) U.S. Cl. .................. 361/309; 361/310; 361/321.2; 29/25.41; 29/25.42

(58) Field of Classification Search ............ 361/301.1, 361/306.3, 303, 321.2, 321.3, 321.5, 322, 361/311–313; 29/25.41, 25.42
See application file for complete search history.

(56) References Cited

U.S. PATENT DOCUMENTS

| | | | |
|---|---|---|---|
| 3,648,132 A | * | 3/1972 | Rayburn ..................... 361/271 |
| 3,694,710 A | * | 9/1972 | Kirschner ................ 361/321.2 |
| 4,539,623 A | | 9/1985 | Irikura et al. |
| 4,618,911 A | | 10/1986 | Cichanowski et al. |
| 6,185,091 B1 | | 2/2001 | Tanahashi et al. |
| 6,262,878 B1 | | 7/2001 | Shirashige et al. |
| 6,380,619 B1 | * | 4/2002 | Ahiko et al. ................ 257/703 |

\* cited by examiner

*Primary Examiner*—Anthony Dinkins
(74) *Attorney, Agent, or Firm*—Fogg & Associates, LLC; Scott V. Lundborg

(57) ABSTRACT

A chip capacitor that includes a first and second terminal and a plurality of first and second conductive plates. The first terminal has a first interfacial attachment area that is adapted to be attached to a host substrate. The second terminal has a second interfacial attachment area also adapted to be attached to a host substrate. The first interfacial attachment area and the second interfacial attachment area separated by at least one relatively thin isolation strip such that the first and second interfacial attachment areas generally approach covering the entire attaching area of the chip capacitor. The plurality of first conductive plates are coupled to the first terminal and the plurality of second plates are coupled to the second terminal. In one embodiment, approximately 50% of the periphery of each first and second conductive plate is coupled to the respective first and second terminals.

26 Claims, 6 Drawing Sheets

LOW ESL AND ESR CHIP CAPACITOR

TECHNICAL FIELD

The present invention relates generally to capacitors and in particular to chip capacitors.

BACKGROUND

The terminals of a standard chip capacitor (e.g. ceramic or metalized stacked film) are comprised primary of surface conductors on opposite ends of the capacitor body. Each terminal may cover the end and may extend slightly around one or more edges (e.g. top, bottom and sides) towards the opposite terminal. The interfacial attachment area of an assembled chip capacitor is limited to the intersection of its terminal area on the bottom side of the capacitor and the mating capacitor footprint of its host substrate. This interface area is typically insufficient for a good electrical and mechanical connection. To compensate for this, the attach pads of the capacitor footprint extend beyond the length and width of the capacitor end terminals to allow formation of peripheral solder fillets up the sides and ends of the terminals. These fillets increase the capacitor solder attach area sufficiently for good electrical and mechanical connection to its host substrate. However, the use of solder fillets to increase the capacitor solder area are prone to tomb-stoning. Tomb-stoning occurs when a chip component becomes partially or completely lifted off one end of the surface of a bonding pad of an integrated circuit. Tomb-stoning typically occurs from surface tension in the end fillets during solder reflow attach processes. Moreover, the use of solder fillets extends the area needed for the chip capacitor.

In addition, each internal conductor plate of a standard chip capacitor is connected along one edge of its periphery to one end surface terminals. Most standard Electronic Industries Alliance (EIA) size chip capacitors terminate each plate along one narrow edge, giving the capacitor body and its plates a forward length-to-width aspect ratio (length/width>1). Capacitor and plate length is defined here as the terminal to terminal dimension. Some non-standard chip capacitors terminate each plate along a width edge, giving the capacitor and its plates a reverse aspect ratio (length/width<1). A capacitor's equivalent series inductance (ESL) and equivalent series resistance (ESR) is proportional to its plate aspect ratio. A lower plate aspect ratio results in lower ESL and ESR as well as better capacitor performance.

For the reasons stated above and for other reasons stated below which will become apparent to those skilled in the art upon reading and understanding the present specification, there is a need in the art for a chip capacitor that has an improved interfacial attachment area and an improved effective plate aspect ratio.

SUMMARY OF INVENTION

The above-mentioned problems of current systems are addressed by embodiments of the present invention and will be understood by reading and studying the following specification.

In one embodiment, a chip capacitor is provided. The chip capacitor includes a first and second terminal and a plurality of first and second conductive plates. The first terminal has a first interfacial attachment area that is adapted to be attached to a host substrate. The second terminal has a second interfacial attachment area also adapted to be attached to a host substrate. The first interfacial attachment area and the second interfacial attachment area separated by at least one relatively thin isolation strip such that the first and second interfacial attachment areas generally approach covering the entire attaching area of the chip capacitor. The plurality of first conductive plates are coupled to the first terminal. Moreover, the plurality of second conductive plates are coupled to the second terminal. The first plates and the second plates are stacked in a manner that alternates between the first and second plates. In addition, the first and second plates are isolated from each other.

In another embodiment, another chip capacitor is provided. The chip capacitor includes a plurality of first conductive plates, a plurality of second conductive plates, isolation material, at least one first terminal and at least one second terminal. Each first and second plate has an outer periphery. Moreover, the first and second plates are alternately stacked. The isolation material separates the first and second alternately stacked first and second plates. The first plate is coupled to the first terminal such that approximately 50% of an outer periphery of each first plate is coupled to the first terminal. In addition, the second plate is coupled to the second terminal such that approximately 50% of an outer periphery of the each second plate is coupled to the second terminal.

BRIEF DESCRIPTION OF THE DRAWINGS

The present invention can be more easily understood and further advantages and used thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide increased interfacial terminal attachment area so as to reduce or eliminate the need for peripheral solder fillets to establish good electrical and mechanical connections. This reduces the chip capacitor's footprint size and also reduces or eliminates tomb-stoning during solder reflow processes. In further embodiments, additional terminals and modified internal plates are used to connect all available terminal areas. Moreover, in one embodiment, the percentage of terminal plate edge termination approaches 50% of each plate's entire periphery. This reduces the effective plate aspect ratio and the larger terminal areas reduce current densities. In addition, embodiments of the present invention reduce capacitor ESL and ESR and provide increased performance.

Referring to FIG. 1, a top view of a chip capacitor 100 of one embodiment of the present invention is illustrated. As illustrated, chip capacitor 100 includes a first terminal 102 and a second terminal 104. The first terminal 102 as a first top section 116 which is separated from a second top section 118 of the second terminal 104 by an isolation gap 103. The isolation gap 103 may be air or any type of dielectric material that has a high resistance to the flow of current. In this embodiment, the rectangular chip capacitor 100 includes triangular surface terminals (the first terminal 102 and the second terminal 104) on opposite corners. FIG. 1B is a bottom view of the chip capacitor 100. The bottom view of FIG. 1B illustrates the total attaching area of chip capacitor 100. In particular, FIG. 3B illustrates a first interfacial attachment area 112 of the first terminal 102 and a second interfacial attachment area 114 of the second terminal 104. The first and second interfacial attachment areas 112 and 114 are adapted to be attached to a mating capacitor footprint of a host substrate. Only a relatively thin isolation gap 103 is used to separate the first and second interfacial attachment areas 112 and 114. Accordingly, in this embodiment, almost the entire attaching area of the chip capacitor 100 is made up of the first and second interfacial attachment areas 112 and 114. This reduces or eliminates the need for fillets.

Figure 1A:
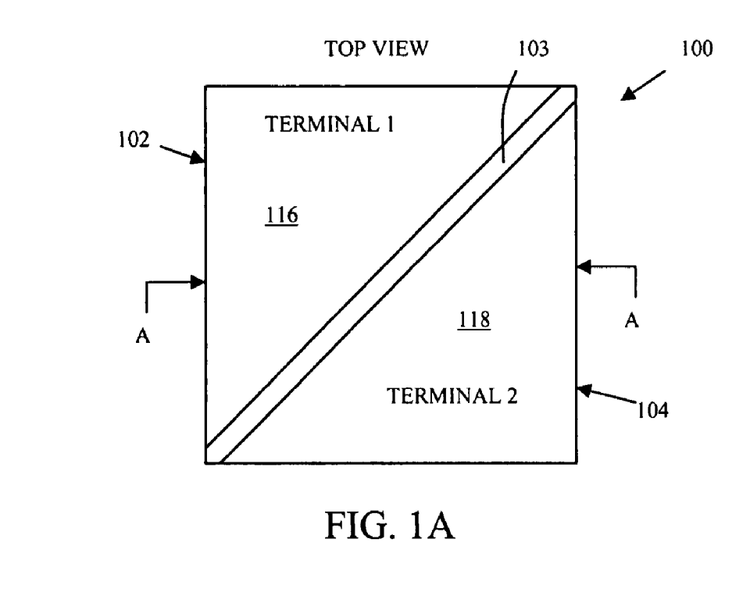
FIG. 1A is a top view of a chip capacitor of one embodiment of the present invention.
Figure 1B:
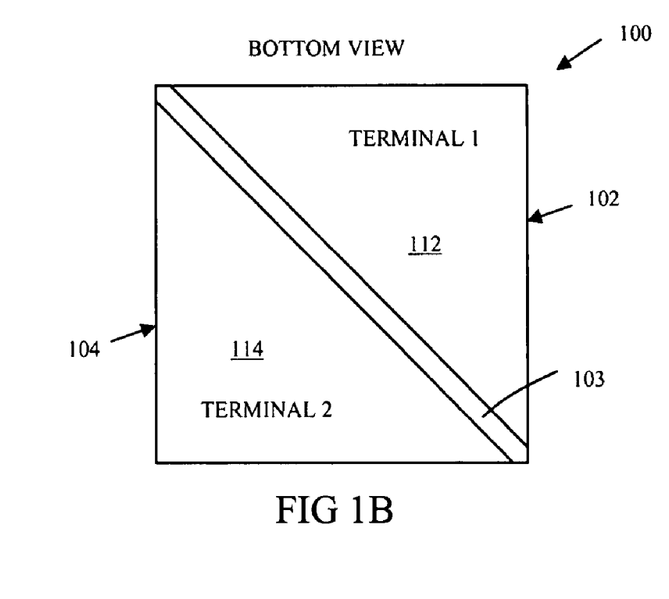
FIG. 1B is a bottom view of the chip capacitor of FIG. 1A.
Figure 1C:
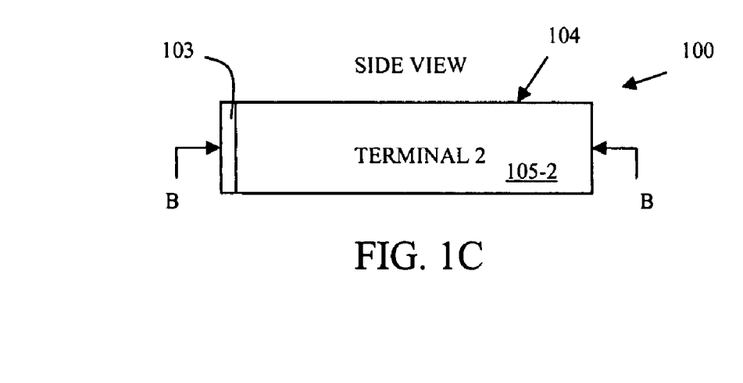
FIG. 1C is a side view of the chip capacitor of FIG. 1A.
Figure 1D:
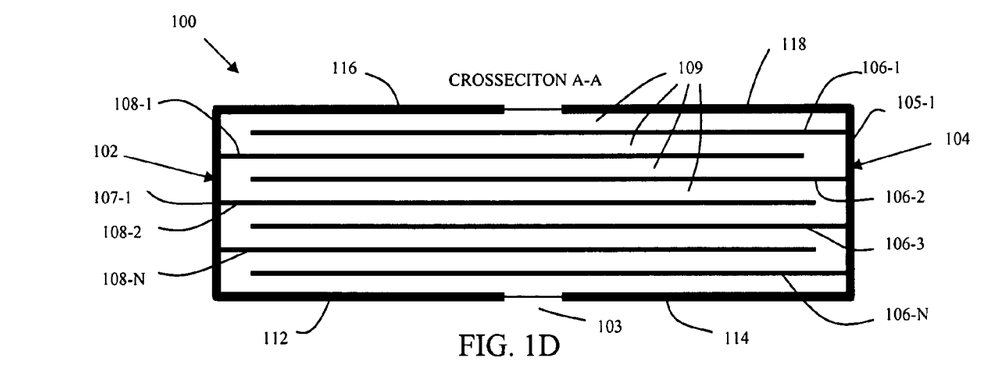
FIG. 1D is a cross-sectional view along A—A of FIG. 1A.
Figure 1E:
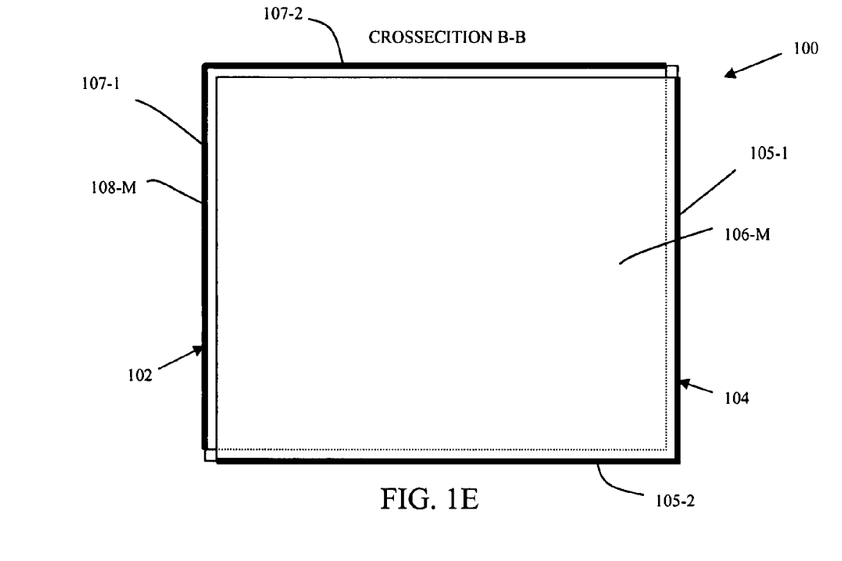
FIG. 1E is a cross-sectional view along B—B of FIG. 1C.

FIG. 1C is a side view of the chip capacitor 100 illustrating a sidewall 105-2 of the second terminal 104. FIG. 1D is a cross-sectional view along line A—A of FIG. 1. As illustrated, the chip capacitor 100 includes a plurality of stacked conductive plates 106-1 through 106-N and 108-1 and 108-N which are separated by isolation layers 109. As illustrated, the first terminal 102 includes the first interfacial attachment area 112, sidewalls 107-1 and 107-2 (see FIG. 1E), and top section 116 which encase a first portion of the first and second conductive plates 106-1 through 106-N and 108-1 and 108-N. The second terminal 104 includes the second interfacial attachment area 114, sidewalls 105-1 and 105-2 (see FIG. 1E), and top section 118 which encase a second portion of the first and second conductive plates 106-1 through 106-N and 108-1 and 108-N. In this embodiment, plates 106-1 through 106-N are coupled along the vertical length of sidewalls 105-1 and 105-2 of the second terminal 104. Plates 108-1 through 108-N are coupled along a vertical length of sidewalls 107-1 and 107-2 of the first terminal 102. FIG. 1E is a cross-sectional view along line B—B of FIG. 1C. FIG. 1E illustrates, a plate 106-M coupled to side walls 105-1 and 105-2 of the second terminal 104 and plate 108-M coupled to sidewalls 107-1 and 107-2 of the first terminal 102. As illustrated, in this embodiment, each plate is terminated on two adjacent sides such that plate termination of each conductive plate approaches 50% of its periphery. This reduces the effective plate aspect ratio and reduces current densities.

Figure 2A:
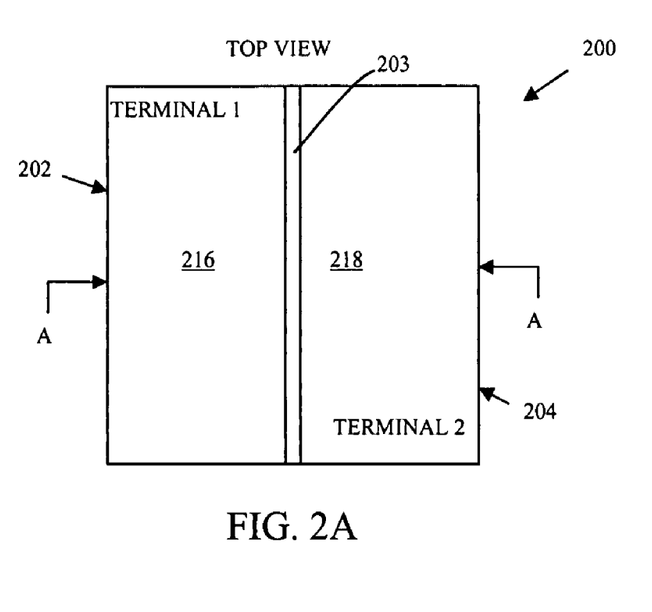
FIG. 2A is a top view of a chip capacitor of another embodiment of the present invention.
Figure 2B:
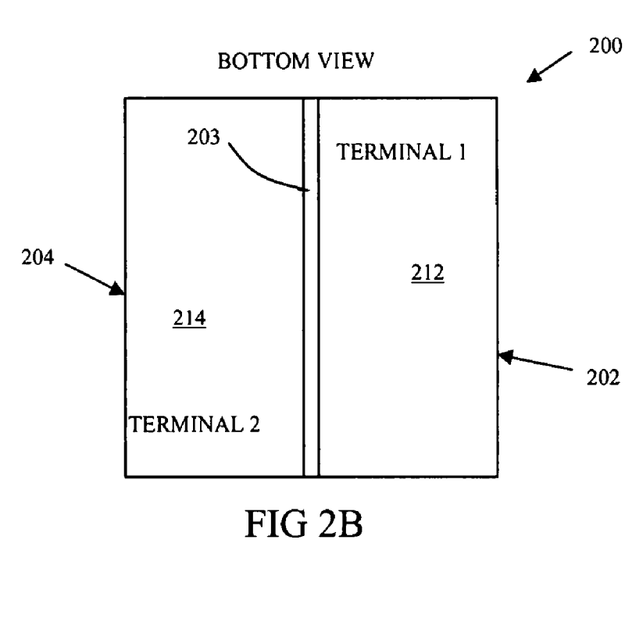
FIG. 2B is a bottom view of the chip capacitor of FIG. 2A.

FIGS. 2A through 2E illustrate another embodiment of a chip capacitor 200 of the present invention. FIG. 2A is a top view illustrating the chip capacitor 200 has a first terminal 202 with a first top section 216 and a second terminal 204 with a second top section 218. Both the first and second top sections 216 and 218 have rectangular forms. As illustrated, the first and second top sections 216 and 218 of the first and second terminals 202 and 204 are separated by an isolation gap 203. The isolation gap is air or a material that has a relatively high resistance to current flow. FIG. 2B illustrates a bottom view of the chip capacitor 200. The bottom view illustrates the total attachment area of the chip capacitor 200. In particular, FIG. 2B illustrates a first interfacial attaching area 212 of the first terminal 202 and a second interfacial attaching area 214 of the second terminal 204. The first and second interfacial attaching areas 212 and 214 are adapted to be coupled to a host substrate. Only a relatively thin isolation gap 203 separates the first and second interfacial attaching areas 212 and 214 from each other. Accordingly, almost the entire potential attaching area is covered by the first and second interfacial attaching areas 212 and 214 which reduces or eliminates the need for fillets.

Figure 2C:
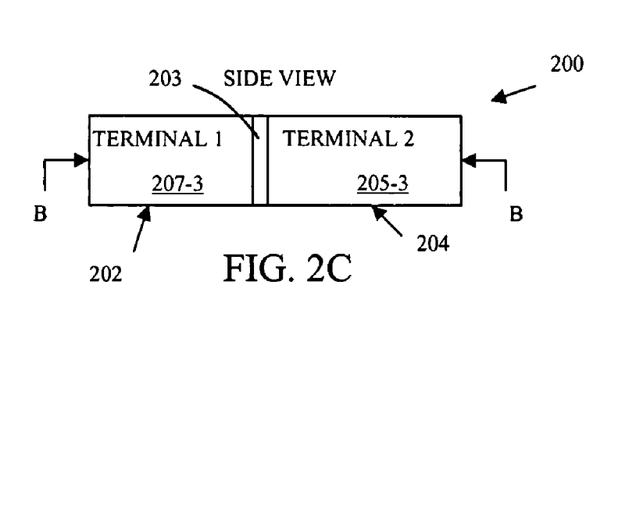
FIG. 2C is a side view of the chip capacitor of FIG. 2A.
Figure 2D:
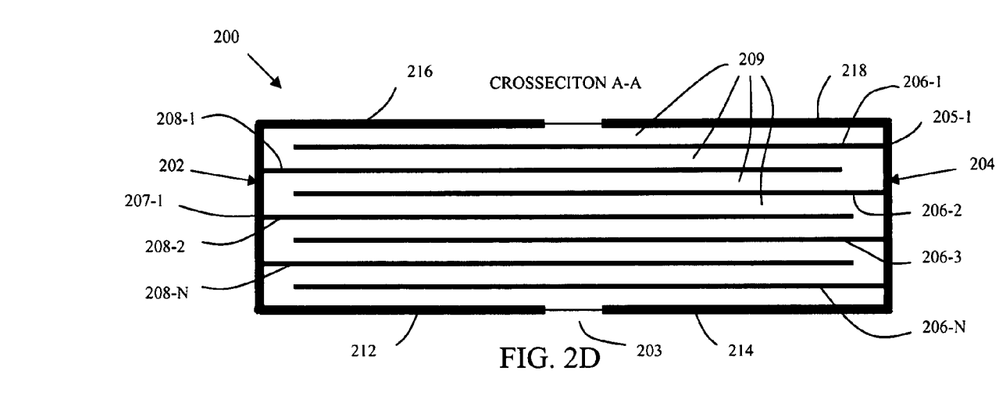
FIG. 2D is a cross-sectional view along A—A of FIG. 2A.
Figure 2E:
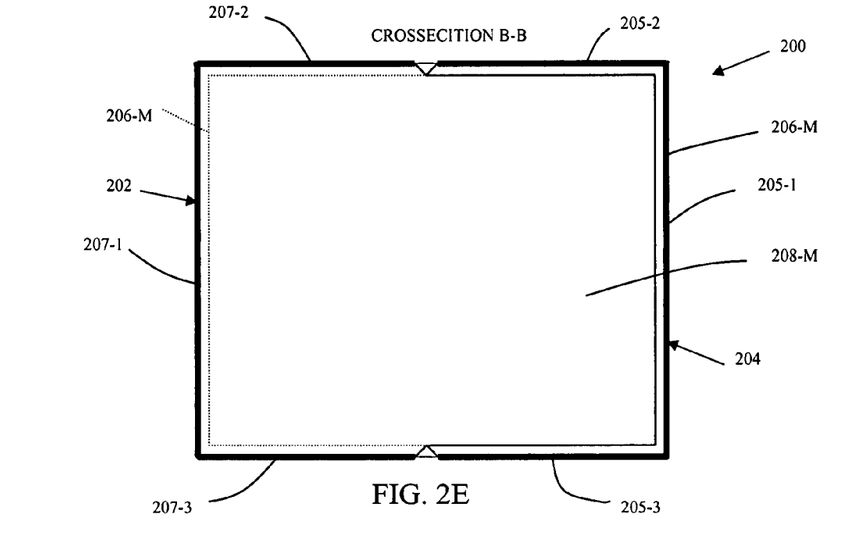
FIG. 2E is a cross-sectional view along B—B of FIG. 2C.

FIG. 2C illustrates a side view of the chip capacitor 200. As illustrated this side view includes a first sidewall 207-3 of the first terminal 202 and a second sidewall 205-3 of the second terminal 204 which are separated by the isolation gap 203. Referring to FIG. 2D, a cross-sectional view along line A—A of FIG. 1 is illustrated. As illustrated plates 206-1 through 206-N are connected along a vertical length of sidewall 205-1 (as well as side walls 205-2 and 205-3 as illustrated in FIG. 2E) of the second terminal 204. Plates 208-1 through 208-N are connected along a vertical length of sidewall 207-1 (as well as sidewalls 207-2 and 207-3 as illustrated in FIG. 2E) of the first terminal 202. As illustrated and described the first terminal 102 encases a first portion of plates 206-1 through 206-N and 108-1 through 108-N and the second terminal 104 encases a second portion of plates 206-1 through 206-N and 108-1 through 108-N. FIG. 2E is a cross-sectional view along line B—B of FIG. 2B. FIG. 2E illustrates the shapes of plate 206-M which is coupled to sidewalls 205-1, 205-2 and 205-3 of the second terminal 204 and plate 208-M which is coupled to sidewalls 207-1, 207-2 and 207-3 of terminal 202. As illustrated, in this embodiment, each conductive plate 206-1 through 206-N and 208-1 through 208-N is connected to three associated adjacent sidewalls such that approximately 50% of the periphery of each plate is attached to its associated sidewall. This reduces the effective plate aspect ratio and reduces current densities.

Figure 3A:
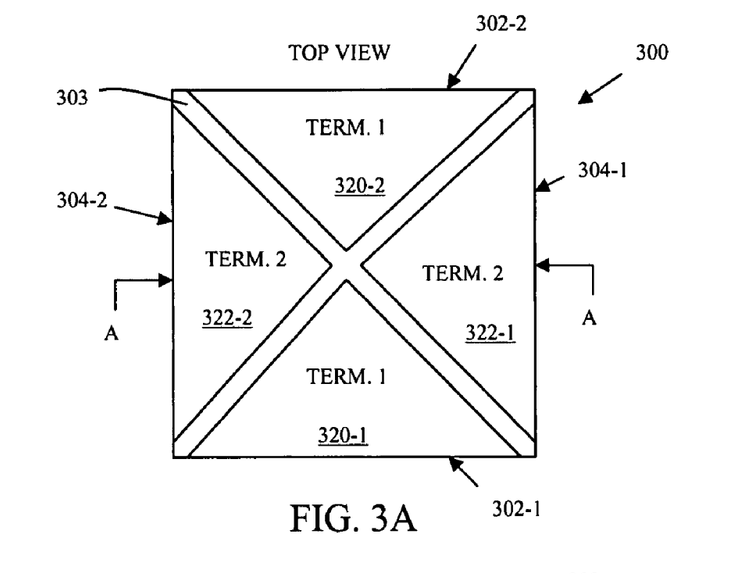
FIG. 3A is a top view of a chip capacitor of yet another embodiment of the present invention.

FIGS. 3A through 3E illustrate another embodiment of a chip capacitor 300 of the present invention. FIG. 3A is a top view illustrating the chip capacitor 300 has a first terminal which is made up of first terminal sections 302-1 and 302-2 and a second terminal which is made up of second terminal section 304-1 and 304-2. Further the first terminal section 302-1 of the first terminal includes the top section 320-1 and the first terminal section 302-2 of the first terminal includes top section 320-2. The second terminal section 304-1 of the second terminal includes the top section 322-1 and the second terminal section 304-2 of the second terminal includes top section 322-2. As illustrate in the top view of FIG. 3A and the bottom view of FIG. 3B, the first terminal sections 302-1 and 302-2 and the second terminal sections 304-1 and 304-2 are each split into triangle sections separated by an isolation layer 303. The isolation gap 303 is made from air or a material that has a relative high resistance to current flow.

Figure 3B:
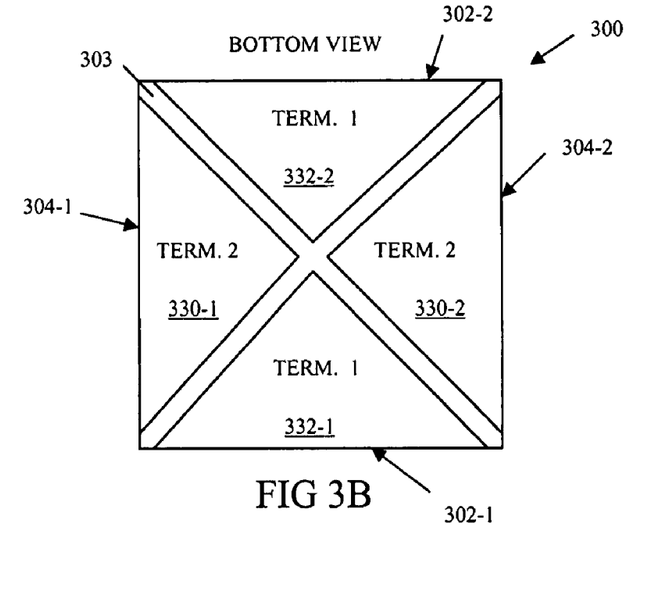
FIG. 3B is a bottom view of the chip capacitor of FIG. 3A.

In FIG. 3B the bottom view of the chip capacitor 300 is illustrated. The Bottom view illustrates the entire attaching surface of the chip capacitor 300. As illustrated, the first terminal section 302-1 includes interfacial attaching area 332-1. First terminal section 302-2 includes interfacial attaching area 332-2. Second terminal section 304-1 includes interfacial attaching area 330-1 and second terminal section 304-2 includes interfacial attaching section 330-2. The first and second interfacial attaching areas 332-1, 332-2, 330-1 and 330-2 are adapted to be attached to a mating capacitor footprint of a host substrate. As illustrated, the first and second interfacial attaching areas 332-1, 332-2, 330-1 and 330-2 are only separated by isolation gap 303 which has two parts that form an x-shape in this embodiment. Accordingly, almost the entire potential attaching area of the chip capacitor 300 is covered by the first and second interfacial attaching areas 332-1, 332-2, 330-1 and 330-2 which reduces or eliminates the need for fillets.

Figure 3C:
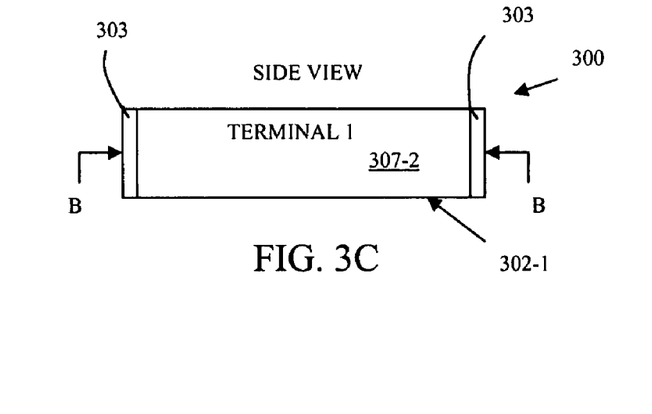
FIG. 3C is a side view of the chip capacitor of FIG. 3A.
Figure 3D:
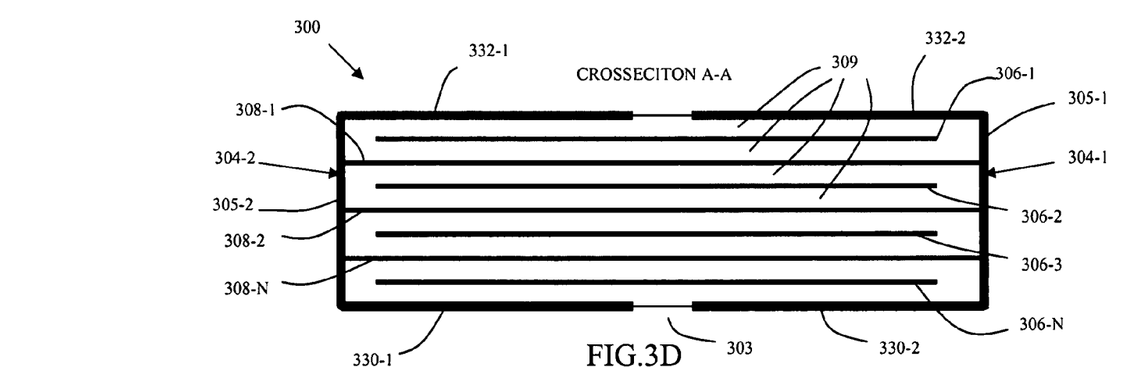
FIG. 3D is a cross-sectional view along A—A of FIG. 3A.
Figure 3E:
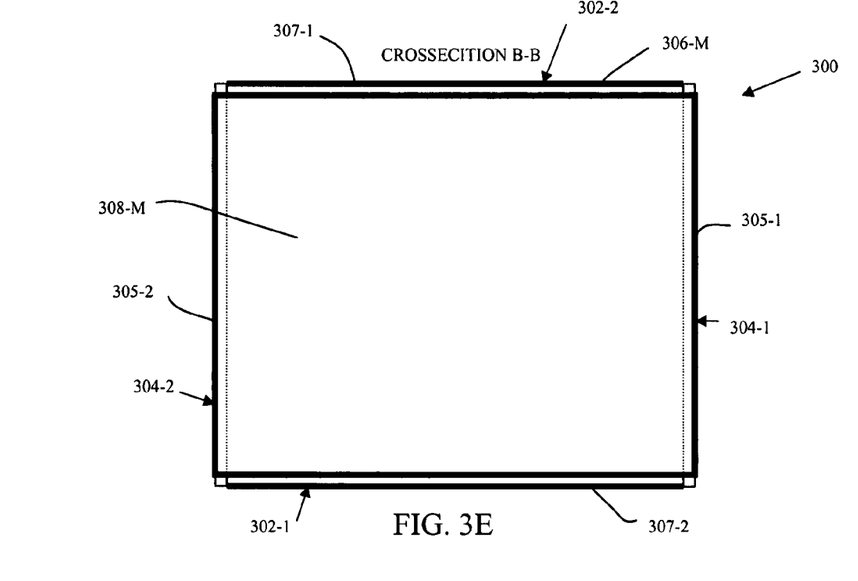
FIG. 3E is a cross-sectional view along B—B of FIG. 3C.

FIG. 3C is a side view of the chip capacitor 300 illustrating sidewall 307-2 of the first terminal 302-1. Referring to FIG. 3D, a cross-sectional view along line A—A of FIG. 1 is illustrated. As illustrated, plates 308-1 through 308-N are connected along a vertical length of sidewalls 305-1 and 305-2 of the first and section sections 304-1 and 304-2 of the second terminal. Plates 306-1 through 306-N are coupled to sidewalls of the first and second sections 302-1 and 302-2 of the first terminal. This is illustrated in the cross-sectional view along line B—B of FIG. 3B in FIG. 3E. In particular, plate 306-M is illustrated as being coupled to sidewall 307-1 of the second section 302-2 of the first terminal and sidewall 307-2 of the first section 302-1 of the first terminal. Also illustrated in FIG. 3E is plate 308-M coupled to sidewalls 305-1 and 305-2 of the first and second sections 304-1 and 304-2 of the second terminal. As with the other embodiments, in this embodiment approximately 50% of an outer periphery of each conductive plate is couple to its associated terminals.

Referring back to FIGS. 3A through 3D, an example of a method of forming one embodiment of the present invention is provided. First a layer of conductive material is deposited and patterned to form the interfacial attaching areas 330-1, 330-2, 332-1 and 332-2. The layers of conductive plates 306-6 through 306-N and 108-1 through 108-N and the insolating material are then formed by deposit techniques using masks and patterning as known in the art. The side walls 305-1, 305-2, 307-1 and 307-2 are then formed. In one embodiment this is done with etching and depositing techniques known in the art. The top sections 320-1, 320-2, 322-1 and 322-2 are then deposited and patterned. Although the above describes techniques and methods to form embodiments of the present invention, it will be understood in the art that other techniques and methods known in the art to form chip capacitors could be used and that the present invention is not limited to the methods of formation as described above. In addition, although each of the embodiments of chip capacitors shown in FIGS. 1A, 2A and 3A illustrate almost the entire top surface being covered with their respective tops sections of the first and second terminals, in other embodiments this is not the case.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A chip capacitor comprising:
   a first terminal, the first terminal having a first interfacial attachment area adapted to be attached to a host substrate;
   a second terminal, the second terminal having a second interfacial attachment area adapted to be attached to a host substrate, first interfacial attachment area and the second interfacial attachment area being separated by at least one relatively thin isolation gap such that the first and second interfacial attachment areas generally approach covering the entire attaching area of the chip capacitor;
   a plurality of first conductive plates coupled to the first terminal; and
   a plurality of second conductive plates coupled to the second terminal, wherein the first plates and the second plates are stacked in a manner that alternates between the first and second plates, the first and second plates further being isolated from each other.

2. The chip capacitor of claim 1, wherein the first terminal further comprises at least one first sidewall, the plurality of first plates being coupled along generally an entire interior vertical length of the at least one first sidewall, further wherein the second terminal further comprises at least one second sidewall, the plurality of second plates being coupled along generally an entire interior vertical length of the at least one second sidewall.

3. The chip capacitor of claim 1, wherein the first terminal further comprises a first section and a second section, further wherein the second terminal comprises a first section and a second section.

4. The chip capacitor of claim 1, wherein the first terminal encases a first section of the first and second plates and the second terminal encases a second section of the first and second plates, further wherein the first and second terminals are isolated from each other by at least one relatively thin isolation gap such that almost all of the first and second plates are encased by the first and second terminals.

5. The chip capacitor of claim 1, wherein the shape of the first interfacial attachment area of the first terminal is one of a triangle and a rectangle.

6. The chip capacitor of claim 1, wherein the shape of the second interfacial attachment area of the first terminal is one of a triangle or a rectangle.

7. The chip capacitor of claim 1, wherein approximately 50% of an outer periphery of each first plate is coupled to the first terminal.

8. The chip capacitor of claim 1, wherein approximately 50% of an outer periphery of each second plate is coupled to the second terminal.

9. A chip capacitor comprising:
   a plurality of first conductive plates, each first plate having an outer periphery;
   a plurality of second conductive plates, each second plate having an outer periphery, the first and second plates being alternately stacked;
   isolation material separating the first and second alternately stacked first and second plates;
   at least one first terminal, each firm plate being coupled to the first terminal such that approximately 50% of outer periphery of each first plate is coupled to the first terminal; and at least one second terminal, each second plate being coupled to the second terminal such that approximately 50% of the outer periphery of the each second plate is coupled to the second terminal.

10. The chip capacitor of claim 9, further comprising:
the first terminal having a first interfacial attachment area adapted to be attached to a host substrate;
the second terminal having a second interfacial attachment area adapted to be attached to a host substrate, first interfacial attachment area and the second interfacial attachment area being separated by at least one relatively thin isolation gap such that the first and second interfacial attachment areas generally approach covering the entire attaching area of the chip capacitor.

11. The chip capacitor of claim 10, further comprising:
the first terminal having a first and second sections; and
the second terminal having a first and second sections.

12. The chip capacitor of claim 10, wherein the shape of the first interfacial attachment area of the first terminal and the second interfacial attachment area of the second terminal is in the form of one of a single triangle, a double triangle and a rectangle.

13. A chip capacitor comprising:
a stack of alternating first and second conductive plates, the stack of first and second conductive plates being isolated from each other;
a first terminal having a first interfacial attachment surface adapted to be attached to a host substrate, the first interfacial attachment surface being in the shape of at least one triangle, a portion of a periphery of the first conductive plates being coupled to the first terminal; and
a second terminal having a second interfacial attachment surface adapted to be attached to the host substrate, the second interfacial attachment surface being in the shape of at least one triangle, a portion of a periphery of the second conductive plates being coupled to the second terminal.

14. The chip capacitor of claim 13, wherein the first interfacial attachment surface of the first terminal is separated from the second interfacial attachment surface of the second terminal by at least one relatively thin isolation gap such that the total area of the first attachment surface and the second interfacial attachment surface approaches a total available attaching surface area of the chip capacitor.

15. The chip capacitor of claim 13, wherein the portion of the periphery of the first conductive plates coupled to the first terminal is approximately 50% of the total periphery of the first conductive plate, further wherein the portion of the periphery of the second conductive plates coupled to the second terminal is approximately 50% of the total periphery of the second conductive plate.

16. The chip capacitor of claim 13, wherein the first interfacial attachment surface is in the shape of two triangles, further wherein the second interfacial attachment surface is also in the shape of two triangles.

17. The chip capacitor of claim 13, further comprising:
the first terminal having a first and second sidewalls extending from the first attachment area, each first conductive plate being coupled to the first and second sidewalls of the first terminal; and
the second terminal having a third and fourth sidewalls extending from the second attachment area, each second conductive plate being coupled to the third and fourth sidewalls of the second terminal.

18. A chip capacitor comprising:
a stack of alternating first and second conductive plates, the stack of first and second conductive plates being isolated from each other;
a first terminal having a first interfacial attachment surface adapted to be coupled to a host substrate, the first interfacial attachment surface being in the shape of a rectangle, the first terminal further having a first, a second and a third sidewall extending from the first interfacial attachment surface, each first conductive plate having an outside periphery wherein approximately 50% of the total outside periphery of each first conductive plate is coupled to the first, second and third sidewalls of the first terminal; and
a second terminal having a second interfacial attachment surface adapted to be attached to the host substrate, the second interfacial attachment surface being in the shape of a rectangle, the second terminal further having a first a second and a third sidewall extending from the second interfacial attachment surface, each second conductive plate having an outside periphery wherein approximately 50% of the total outside periphery of each second conductive plate is coupled to the first, second and third sidewalls of the second terminal.

19. The chip capacitor of claim 18, wherein the first interfacial attachment surface of the first terminal is separated from the second interfacial attachment surface of the second terminal by a relatively thin isolation gap.

20. The chip capacitor of claim 18, further comprising:
a first upper portion of the first terminal extending from the first, second and third sidewalls so as to encase a first portion of the first and second conductive plates; and
a second portion of the second terminal extending from the first, second and third sidewalls of the second terminal so as to encase a second portion of the first and second conductive plates.

21. A method of forming a chip capacitor, the method comprising:
forming a first interfacial attachment area of a first terminal, the first interfacial attachment area adapted to be attached to a host substrate;
forming a second interfacial attachment area of a second terminal, the second interfacial attachment area adapted to be attached to a host substrate;
forming at least one relatively small isolation gap between the first interfacial attachment area and the second interracial attachment area such that almost an entire attaching surface of the chip capacitor is covered by the first and second interfacial attachment areas; and
forming a stack of alternating first and second conducting plates separated by isolation material, wherein the first conducting plates are formed to be coupled to the first terminal and the second conducting plates are formed to be coupled to the second terminal.

22. The method of claim 21, further comprising:
forming a first, second and third sidewalls extending from the first interfacial attachment area, the first conductive plates being coupled to the first, second and third sidewalls such that approximately 50% of an outside periphery of each first conductively plate is coupled to the first, second, and third sidewalls; and
forming a fourth, fifth and sixth sidewalls extending from the second interfacial attachment area, the second conductive plates being coupled to the fourth, fifth and sixth sidewalls such that approximately 50% of an outside periphery of each second conductively plate is coupled to the fourth, fifth and sixth sidewalls.

23. The method of claim 22, further comprising:

forming a top section of the first terminal, the top section extending from the first, second and third sidewalls so as to encase a first portion of the first and second conductive plates; and forming a top section of the second terminal, the top section extending from the fourth, fifth and sixth sidewalls so as to encase a second portion of the first and second conductive plates.

24. A method of forming a chip capacitor, the method comprising:

forming a first interfacial attachment area of a first terminal, the first interfacial attachment area adapted to be attached to a host substrate;

forming a second interfacial attachment of a second terminal, the second interfacial attachment area adapted to be attached to a host substrate;

forming at least one relatively small isolation gap between the first interfacial attachment area and the second interfacial attachment area;

forming a stack of alternating first and second conducting plates separated by isolation material overlaying the first and second interfacial attachment area;

forming at least two sidewalls extending from the first interfacial attachment area, the first conducting plates being coupled to the at least two sidewalls wherein approximately 50% of an outer periphery of each first conducting plate is coupled to the at least two sidewalls extending from the first interfacial attachment area; and forming at least two sidewalls extending from the second interfacial attachment area, the second conducting plates being coupled to the at least two sidewalls wherein approximately 50% of an outer periphery of each second conducting plate is coupled to the at least two sidewalls extending from the second interfacial attachment area.

25. The method of claim 24, further comprising:

forming a first top section of a first terminal, the first top section extending from the at least two sidewalls that extend from the first interfacial attachment area wherein the first top section, the at least two sidewalls that extend from the first interfacial attachment area and the first interfacial attachment area encase a first portion of the first and second conductive plates; and forming a second top section of a second terminal, the second top section extending from the at least two sidewalls that extend from the second interfacial attachment area wherein the second top section, the at least two sidewalls that extend from the second interfacial attachment area and the second interfacial attachment area encase a second portion of the first and second conductive plates.

26. The method of claim 24, further comprising:

forming an interfacial attachment area; and patterning the interfacial attachment a into a first interfacial attachment area having two sections and a second interfacial attachment also having two sections.

* * * * *

UNITED STATES PATENT AND TRADEMARK OFFICE
CERTIFICATE OF CORRECTION

PATENT NO.         : 7,016,176 B2
APPLICATION NO. : 11/100872
DATED                 : March 21, 2006
INVENTOR(S)       : Sundstrom It is certified that error appears in the above-identified patent and that said Letters Patent is hereby corrected as shown below:

At Claim 9, Column 6, line 64, please replace "firm" with --first--
At Claim 21, Column 8, line 48, please replace "interracial" with --interacial--
At Claim 26, Column 10, line 27, please replace "interfacial attachment a" with --interfacial attachment area--
At Claim 26, Column 10, line 29, please replace "interfacial attachment also having two sections" with --interfacial attachment area also having two sections--

Signed and Sealed this

Ninth Day of January, 2007

JON W. DUDAS
*Director of the United States Patent and Trademark Office*